April 1, 1952     F. W. GUMPP     2,591,424
FURNACE CHARGING DEVICE
Filed Sept. 2, 1948     3 Sheets-Sheet 1
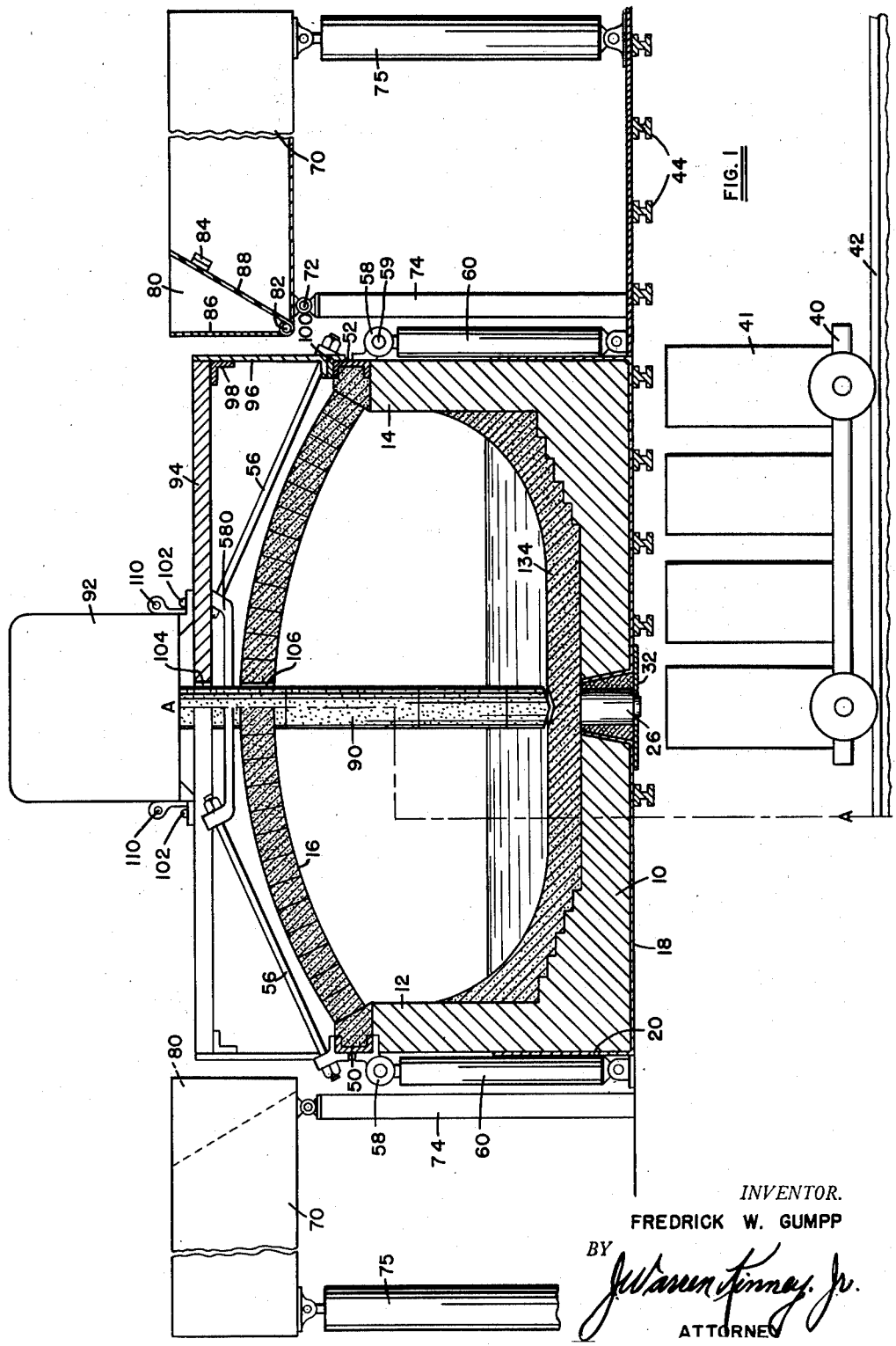
INVENTOR.
FREDRICK W. GUMPP
BY
ATTORNEY

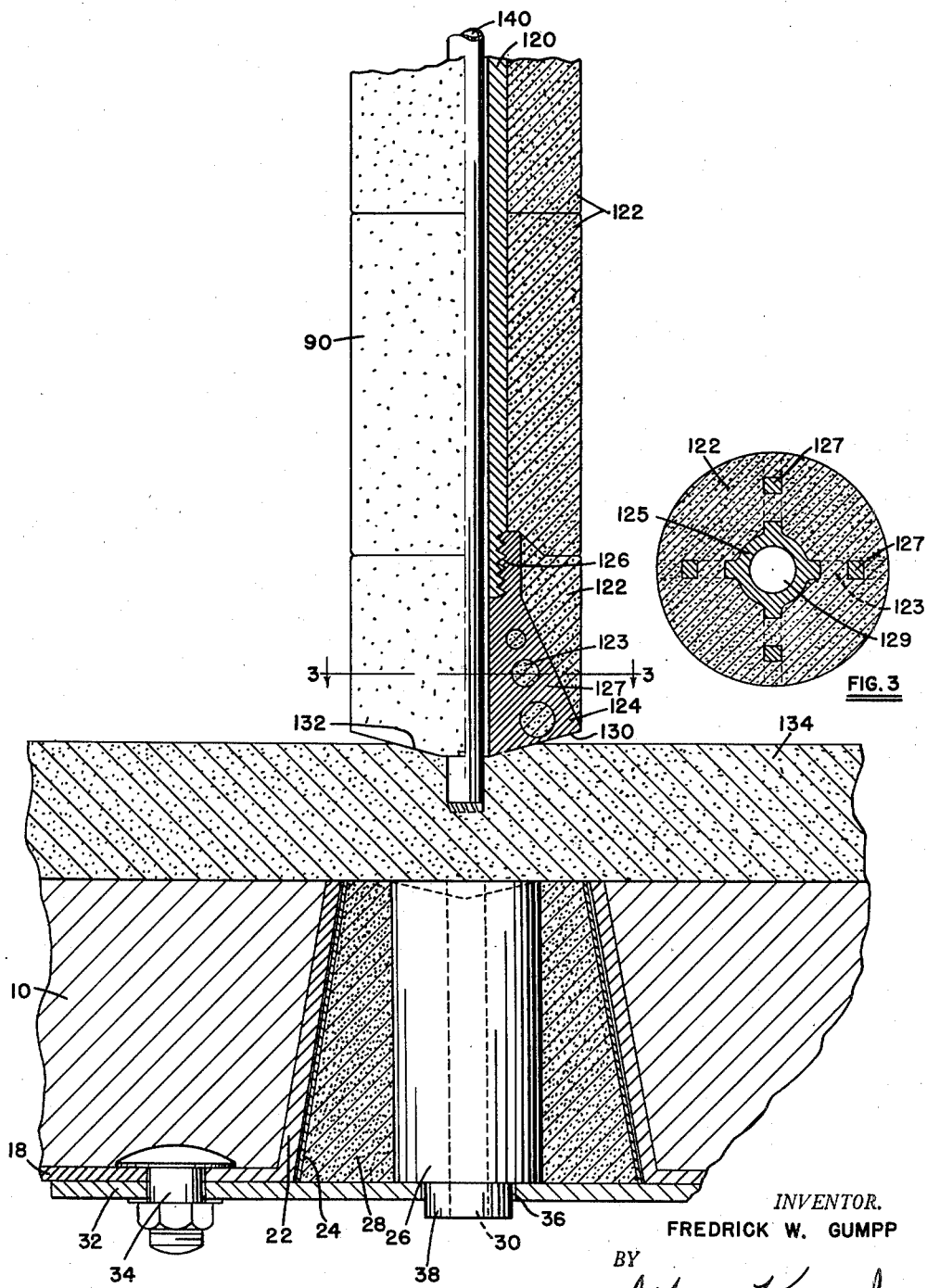

INVENTOR.
FREDRICK W. GUMPP

Patented Apr. 1, 1952

2,591,424

UNITED STATES PATENT OFFICE 2,591,424

FURNACE CHARGING DEVICE

Fredrick W. Gumpp, Massillon, Ohio, assignor of twenty-five per cent to J. Warren Kinney, Jr., Cincinnati, Ohio Application September 2, 1948, Serial No. 47,468

2 Claims. (Cl. 214—18)

This invention relates to a method and apparatus for efficiently converting light bulk scrap in "as is" condition into so-called pig scrap of controlled analysis for remelting in other steel making operations.

An object of the invention is to provide a comparatively inexpensive metal melting furnace which is provided with tiltable charging platforms disposed along the side walls of the furnace. Bulk scrap in an "as is" condition may be accumulated on these platforms during operation of the furnace, said platform being tiltable for charging the scrap thru the top of the furnace upon removal of a section of the furnace roof.

Another object of the invention is to provide a furnace with means for effecting discharge of molten metal thru the bottom wall of the furnace directly into suitable molds thereby reducing the tapping time to a minimum while eliminating the necessity for costly equipment such as ladle cranes, ladles, stoppers, rigs, refractories, molds, buggies, and the like.

A further object of the invention is to provide a furnace with means for effecting tapping of the furnace by means of a hollow stopper rod supported from that portion of the furnace roof above and in axial alignment with a pouring nozzle in the furnace bottom.

Still another object of the invention is to provide a metal melting furnace with a hollow stopper rod secured relative to and carried by that portion of the furnace roof located over a pouring nozzle located in the bottom of the furnace, wherein the stopper rod is so constructed and arranged as to facilitate the introduction of desired elements into the melt, and/or to discharge suitable elements directly into the interior of the stream of metal being discharged thru the pouring nozzle.

Still another object of the invention is to provide a furnace construction having the hereinabove described characteristics and wherein the hollow stopper rod is provided with means for establishing a tap hole thru the rammed material in the bottom of the furnace and in communication with the axial bore of a pouring nozzle mounted in the bottom of the furnace.

Another object of the invention is to provide a metal melting furnace with an easily replaceable pouring nozzle unit.

Still a further object of the invention is to teach a method of controlling the chemical analysis of the melt of a metal melting furnace by introducing various elements directly into the interior of the stream of metal being discharged through the pouring nozzle.

A further object of the invention is to provide a furnace having the hereinabove described characteristics which may be economically erected at those geographic locations where light scrap is available, thereby enabling such furnaces to be operated by scrap dealers, scrap producers or scrap users, at places remote from the large steel centers. In this manner the scrap may be efficiently and effectively reduced to pig scrap which may be economically handled, and which by reason of its controlled analysis, will find a ready market.

Another object of the invention is to provide a furnace of the open hearth type, the roof of which is provided with a removable section having an area substantially co-extensive with the bottom of the furnace, and wherein said removable roof section is provided with bearing members so constructed and arranged to support the entire weight of said removable section for effecting a lifting of one or both sides of the removable section for facilitating charging of the furnace from one or both sides.

Still a further object of the invention is to provide an open hearth furnace with a removable roof section having an area substantially co-extensive with the bottom of the furnace and wherein said removable roof section has a load bearing platform fixed relative thereto, said platform being constructed and arranged to receive and support suitable mechanism for supporting and actuating a hollow stopper rod assembly adapted to be lowered downwardly thru said removable roof section, into the interior of the furnace, thence into and thru the slag and molten metal for establishing a passageway thru the bed of rammed material and in communication with a pouring nozzle mounted in the bottom wall of the furnace, said stopper rod being further actuatable for controlling the discharge of molten metal thru the pouring nozzle.

Another object of the invention is to provide a method of producing pig scrap having a known or predetermined analysis, and wherein the melt may be tapped at any time, in any desired amount.

Another object is to teach a method of providing a dense charge while saving from 25% to 30% of the present furnace melting time.

A further object of the invention is to provide a furnace which is provided with tiltable charging platforms which include hopper portions or material bins for the reception of quantities of suitable elements such as manganese, carbon and the like, and wherein said hoppers or material bins are pivotally secured relative to the charging platform whereby to facilitate the introduction of the contents of said hoppers or material bins into the interior of the furnace independently of and prior to the introduction of the scrap carried by the platform.

Still a further object of the invention is to provide a metal melting furnace which may be charged with all types of "as is" scrap and with a minimum, if any, baling, cutting and handling, thereby eliminating the need for expensive cumbersome charging machines and charging boxes heretofore used by the industry.

These and other objects are attained by the means described herein and as disclosed by the accompanying drawings, in which:

Fig. 1 is a vertical section thru a typical furnace embodying the teachings of the present invention, wherein those portions to the right of line A—A have been taken thru the center portion of the furnace; and those portions to the left of line A—A have been taken thru the forward end of the furnace bottom.

Fig. 2 is an enlarged sectional view thru the bottom of the furnace adjacent the pouring nozzle, and the lower end of the hollow stopper rod comprising a detail of the invention.

Fig. 3 is a view taken on line 3—3 of Fig. 2.

Figure 4:
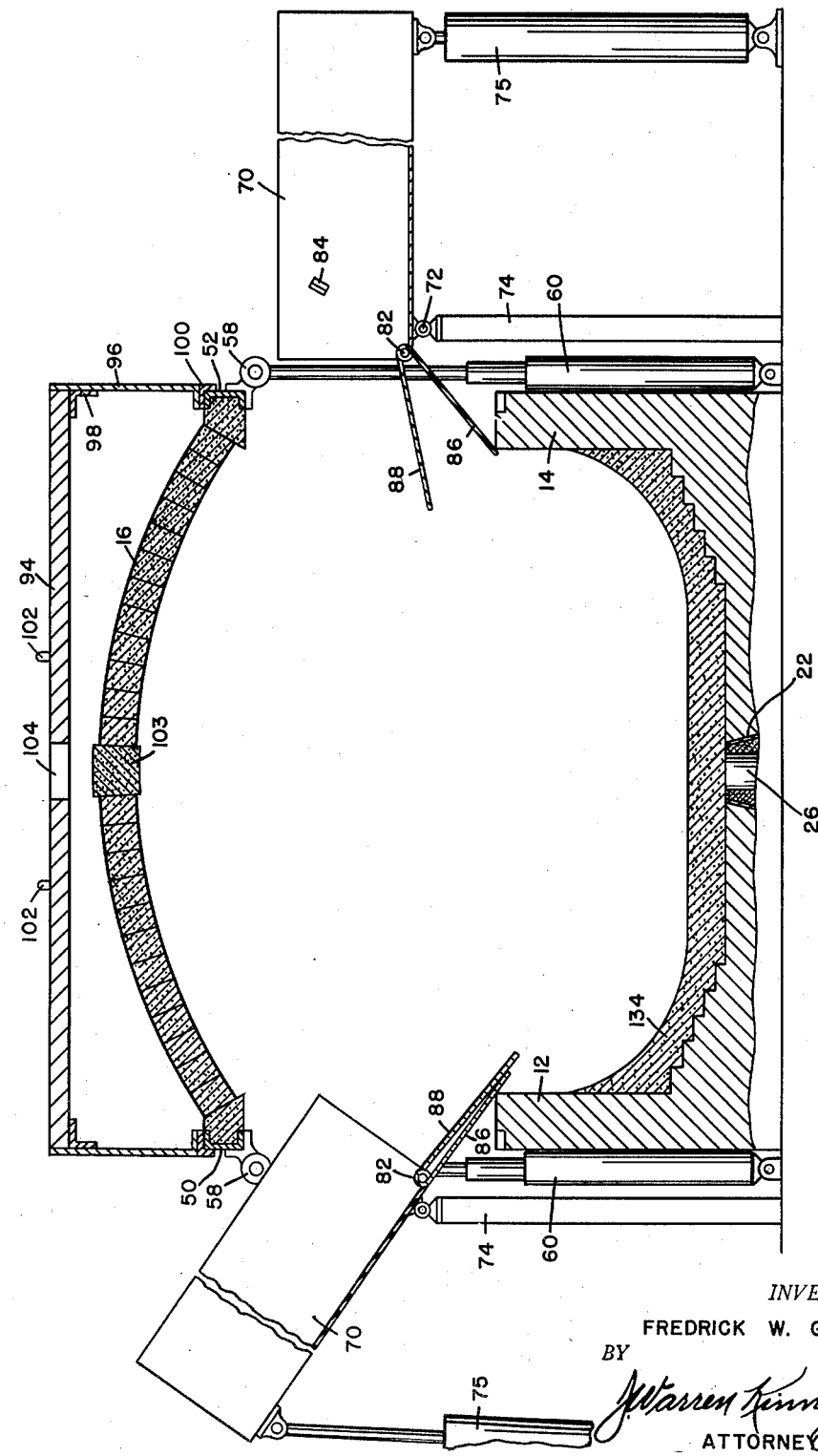
Fig. 4 is a vertical section taken thru the center portion of the furnace showing the roof in an elevated position, and showing the charging platforms in different operative positions.

With reference now to Fig. 1, it will be observed that the furnace comprises, broadly speaking, a bottom 10, a front wall 12, a back wall 14 and a removable roof section 16. A furnace or hearth pan 18 extends under bottom 10 and, as is the usual practice, is provided with upturned portions 20.

With particular reference now to Fig. 2, it will be noted that the bottom portion of the hearth pan is not continuous but is provided with an integrally formed upwardly extending conical portion 22, the height of which is of a dimension approximating the thickness dimension of bottom 10.

A pouring nozzle insert is adapted to be received within the interior of conical portion 22, said insert comprising an outer wall or shell 24 of sheet metal or the like, having a taper complementary to that of portion 22. A nozzle brick 26 is disposed axially of shell 24, being fixedly secured therein by means of rammed material 28, which may be suitably baked to provide an integral unit comprising shell 24, nozzle brick 26 and rammed material 28 receivable within portion 22. Pouring brick 26 may be provided with an axial bore or tap hole 30, which may be normally closed by means of a loosely packed refractory material.

The pouring nozzle assembly may be quickly and effectively attached or removed by means of mounting plate 32 which may be removably secured to and carried by hearth pan 18 by means of suitable bolts 34, or the like. The mounting plate includes an aperture 36 thru which nose or nozzle portion 38 of the nozzle brick may project, as illustrated. It will be understood that access to the pouring nozzle may be had from the roof portion of a runway extending laterally under the furnace, and in which runway suitable molds 41 may be conveyed beneath the pouring nozzle on a suitable conveyance such as a car indicated generally by the numeral 40 which may be mounted on tracks 42.

As clearly disclosed in Fig. 1, those portions of the furnace over the passageway may be supported by structural members 44, as well known to the industry.

With reference still to Fig. 1, it will be noted that skew back channels 50 and 52 extend along and are secured to the front and rear edges of the removable roof section 16, said channels being rigidly interconnected by means of reenforcing elements 56 and 580 which strengthen the roof section so that it may be moved about as a single integral unit. Bearing brackets 58 are secured to and carried by channels 50 and 52, said brackets being constructed and arranged to support the entire weight of the removable roof section when it is not supported on walls 12 and 14.

Means, such as, by way of example, hydraulic jacks 60 may be operatively associated with the bearing brackets for effecting a lifting of one or both edges of roof section 16 upwardly for opening the top of the furnace. It should be understood that in those instances where suitable hoists are available, roof section 16 may be lifted by cranes instead of by the hydraulic jacks 60. For maximum flexibility each bearing bracket 58 is preferably secured in pivotal relationship with the upper end of its associated hydraulic jack, as at 59, thereby enabling one side of the roof to be raised relative to or by a different amount than the other side, as required or desired. In those instances where the removable roof section is of a dimension approximating 20 feet long by 15 feet wide four jacks may be used, one adjacent each of the skew channels 50 and 52.

Charging platforms, denoted generally by the numerals 70, may be provided one along the front and one along the rear edge of the furnace. The forward or inner side of each platform may be pivotally secured as at 72 to a suitable supporting element 74, whereas the opposite or outer side of each platform may be supported on hydraulic jacks 75 or by other suitable means operable for moving the platform from a lowered, loading position to a tilted, furnace-charging position.

The dimension of platforms 70 are such as to accommodate a sufficient quantity of light, "as is" scrap to completely charge the furnace at one time. In the preferred embodiment of the invention, the inner side of each platform is provided with a hopper or material bin 80 pivotally secured as at 82 to the forward edge of platforms 70. Bins 80 are constructed and arranged to receive desired quantities of such elements as manganese, carbon or the like. By reason of the structural details of said bins, their contents may be deposited into the interior of the furnace prior to and independently of tilting of platforms 70, thereby providing great flexibility of furnace operation, see Fig. 4.

Suitable means such as a stop 84 may be provided for normally maintaining bins 80 in a retracted loading position, it being further understood that wall 86 will, when the bin has been moved to a lowered, furnace charging position, overlappingly engage the upper end of a front or rear furnace wall, as indicated in Fig. 4, thereby depositing the materials contained within bin 80 into the interior of the furnace. After the contents of bin 80 have been thus discharged, wall 88 may, by reason of its pivotal connection with reference to front bin wall 86 and bottom 87 of the platform, assume the position indicated on the left side of Fig. 4; that is, wall 88 may be disposed in overlapping relationship with wall 86.

When platform 70 is tilted to a discharging position, see the left side of Fig. 4, the scrap contained thereon will slide down over wall 88 and then drop into the furnace.

As soon as the charging operation has been completed, roof section 16 may be lowered and the melting operation commenced. It will be observed that the manner in which loading platforms 70 are associated with reference to the furnace walls enables the furnace to be charged when the removable roof 16 has been elevated by an amount just sufficient to clear the front and rear walls of swingable bin 80.

After the scrap has been suitably reduced to a molten state, further elements may be added to the melt by means of a hollow stopper rod denoted generally by the numeral 90 which may be supported by and operated from a suitable device, denoted generally by the numeral 92 adapted to be received on and carried by work platform 94 secured over and in spaced relationship with removable roof section 16. If desired, the work platform may be secured to and supported by skew channels 50 and 52 by means of structural elements 96, 98 and 100.

Suitable means such as dowel elements 102 may be carried by work platform 94 in order to insure accurate alignment of device 92 and stopper rod 90 with reference to apertures 104 and 106 provided thru work platforms 94 and removable roof section 16, respectively, each of which apertures are disposed in substantially vertical alignment with the axis of the pouring nozzle assembly 26 secured to and carried by bottom wall 10.

It will be understood that suitable means, such as a plug brick, 103, Fig. 4, will normally close aperture 106 during those periods of time when the furnace is brought up to heat, said plug being conveniently accessible from the work platform.

The stopper rod assembly and drive mechanism 92 are adapted to be moved as a unit onto work platform 94 by suitable means, such as, by way of example, a crane or the like; hook like members 110 may be provided for this purpose.

With reference now to Fig. 2, it will be noted that stopper rod 90 includes an axially disposed hollow casing 120 to the outer face of which a suitable insulating or refractory material 122 is provided for protecting it from the deleterious effects of the temperatures, gases and molten metal of the furnace. In the preferred embodiment of the invention, the lower portion of casing 120 is provided with a cutting tool 124 threadably secured thereto as at 126. This cutting tool may include a plurality of laterally extending webs or fins 127, each of which are secured to and carried by a central tubular portion 125 and each of which may be provided with suitable apertures 123 through which refractory material extends for locking it to the cutting tool, as illustrated.

The lower edge of each of fins 127 may be provided with a cutting or abrading edge 130 for effecting a tapered seat 132 in the bed of rammed material 134, and with which seat the forward end of the stopper may be associated for controlling the flow of molten material from the furnace to pouring nozzle 26.

It will be understood that a suitable rotary motion will be imparted to the stopper rod in order that seat 132 may be cut or formed in the bed of rammed material. After the seat has thus been provided, a suitable drill denoted generally by the numeral 140 may be lowered axially thru casing 120 and then rotated for cutting a passageway thru the bed of rammed material 134 in axial alignment with bore 30 of nozzle brick 26. After a passageway has been thus provided thru the rammed material, the loosely packed refractory in bore 30 of the pouring nozzle may be dislodged thereby providing a clean, well defined tapping channel. When the stopper rod is elevated, the molten metal will flow thru the pouring nozzle into suitable molds 41, see Fig. 1.

In those instances where it is desirable to introduce the various elements into the melt, suitable means may be provided for introducing such elements under pressure, downwardly thru casing 120 directly into the stream of metal being discharged from the bottom of the furnace into the tap hole.

In those instances where the chemical analyses of the melt does not require the addition of further elements, a suitable stopper plug may be lowered thru casing 120 for preventing the entry of molten metal upwardly into the interior of the casing.

In other instances, suitable elements may be introduced under pressure, downwardly thru casing 120 directly into the molten metal of the furnace but prior to the establishment of an opening thru the bed of rammed material. In this manner, it will be observed that the desired elements may be added to the molten metal beneath the surface of the slag, thereby materially increasing the effectiveness of such additions.

After the furnace has been tapped, the tap hole may be plugged by introducing rammed material into the hole through the hollow stopper rod, thereby effectively sealing the furnace bottom for the next melt.

After the tap hole has been plugged, the pouring nozzle may be removed and a new or reconditioned one attached. Further rammed material may then be introduced through rod 90 to assure a good sound bed of rammed material 134.

After the tap hole through the rammed material has been completely plugged, the stopper rod assembly including device 92 may be lifted from the work platform after which aperture 106 in removable roof section 16 may be closed by a suitable brick plug, 103.

The removable roof section, including work platform 94 may then be lifted to facilitate charging of the furnace, see Fig. 4.

It will be observed that a furnace constructed and arranged as illustrated in the drawings may be operated in such a manner that the melt may be partially tapped, after which the tap hole may be sealed off by means of rammed material, after which the analysis and/or temperature of the remaining melt may be completely and radically changed from that already tapped, thereby providing maximum flexibility of furnace operation.

It should be observed that the characteristics or analysis of the melt discharged thru pouring nozzle 26 may be effectively controlled at the time of tapping by introducing or injecting suitable control substances directly into the stream of molten metal being tapped. In this manner various alloys would be introduced downwardly thru casing 120 and injected, by suitable means, into the melt entering the top of the tap hole.

If desired, deoxidizers, such as, by way of example, ferro-silicon, manganese or other suitable substances, may be introduced into the melt for reducing the oxygen content thereof. In the same manner, desulphurizers, such as aluminum silicon, may be introduced into the melt.

It will likewise be observed that suitable flushing agents, such as argon or boron gas, may be introduced into the melt for the purpose of eliminating the hydrogen gas particles contained in the melt. When the flushing is accomplished thru hollow stopper rod 98 and is introduced into the melt as it enters the top of the tap hole, the flushing gas reaches and reacts with a maximum area of the melt flowing thru the nozzle thereby insuring positive results heretofore unobtainable in the steel making art.

It should be further understood that suitable control substances, which term as used herein includes alloys, deoxidizers, desulphurizers and flushing agents, may be injected into the molten metal entering the tap hole whereby the substance will have completely reacted with the melt incident to its passage thru the tap hole and whereby the molten metal discharged from the tap hole will have attained the desired characteristics.

It should be understood that the disclosures and structural details are exemplary in nature, rather than restrictive and that suitable changes and modifications may be made in the structural details of the device, within the scope of the appended claims, without departing from the spirit of the invention.

What is claimed is:

1. A top-charging open hearth furnace including front, rear and side walls, a removable roof spanning the upper portions of said walls for controlling access to the interior of said furnace, means to elevate said roof for uncovering the upper edges of said front and rear walls, scrap platforms located adjacent and extending along substantially the entire length of the upper edges of said front and rear walls, and means for tilting said platforms relative to the upper edges of said front and rear walls for discharging the contents of said platforms into the interior of the furnace over the upper edges of said front and rear walls.

2. A top-charging open hearth furnace including front, rear and side walls, a removable roof spanning the upper portions of said walls for controlling access to the interior of said furnace, means to elevate said roof for uncovering the upper edges of said front and rear walls, scrap platforms located adjacent and extending along substantially the entire length of the upper edges of said front and rear walls, a side panel hingedly secured along that side of each platform adjacent the furnace movable between elevated scrap confining position and a lowered position extending over the upper edge of an adjacent furnace wall, said panel dimensioned to span the space between its associated platform and the interior of the furnace inwardly of said adjacent furnace wall, and means for tilting said platforms relative to the upper edges of said front and rear walls for discharging the contents of said platforms into the interior of the furnace over the upper edges of said front and rear walls.

FREDRICK W. GUMPP.

REFERENCES CITED

The following references are of record in the file of this patent:

UNITED STATES PATENTS

| Number | Name | Date |
| --- | --- | --- |
| 567,848 | Campbell | Sept. 15, 1896 |
| 672,601 | Frolich | Apr. 23, 1901 |
| 676,643 | Wellman | June 18, 1901 |
| 1,076,706 | Rowe | Oct. 28, 1913 |
| 1,135,025 | Klug | Apr. 13, 1915 |
| 1,409,716 | Henshaw | Mar. 14, 1922 |
| 1,448,069 | Graham | Mar. 13, 1923 |
| 1,554,367 | Rackoff | Sept. 22, 1925 |
| 1,586,177 | Cole | May 25, 1926 |
| 1,844,701 | Tama | Feb. 9, 1932 |
| 2,146,751 | Linder | Feb. 14, 1939 |
| 2,204,813 | Muskat | June 18, 1940 |
| 2,314,729 | Mursch | Mar. 23, 1943 |
| 2,358,074 | Kincaid | Sept. 12, 1944 |

FOREIGN PATENTS

| Number | Country | Date |
| --- | --- | --- |
| 224,436 | Germany | July 21, 1910 |